(12) United States Patent
Macias

(10) Patent No.: US 6,374,466 B1
(45) Date of Patent: Apr. 23, 2002

(54) SPRING LOADED AND LATCHABLE STAKE POCKET TIE DOWN APPARATUS

(76) Inventor: Vincent I. Macias, 325 Springpark Cir., San Jose, CA (US) 95136

( * ) Notice: Subject to any disclaimer, the term of this patent is extended or adjusted under 35 U.S.C. 154(b) by 0 days.

(21) Appl. No.: 09/694,399

(22) Filed: Oct. 23, 2000

Related U.S. Application Data

(60) Provisional application No. 60/161,698, filed on Oct. 26, 1999.

(51) Int. Cl.[7] ............................................... F16G 11/00
(52) U.S. Cl. .............. 24/132 R; 24/134 R; 24/134 KB; 410/107
(58) Field of Search ........................... 24/132 R, 134 R, 24/134 KB, 265 CD, 115 G, 134 L, 115 K; 248/499; 410/107, 109, 111, 112

(56) References Cited

U.S. PATENT DOCUMENTS

| 3,556,457 | A | * | 1/1971 | Patnaude .................... 248/499 |
| 4,820,093 | A | * | 4/1989 | Hirakui et al. .............. 410/107 |
| 5,548,873 | A | * | 8/1996 | Macias ....................... 24/134 R |
| 6,000,890 | A | * | 12/1999 | Macias ................. 24/134 R X |
| 6,065,917 | A | * | 5/2000 | Shambeau et al. ...... 410/112 X |

* cited by examiner

Primary Examiner—Robert J. Sandy
(74) Attorney, Agent, or Firm—Intellectual Property Law Group LLP; Otto O. Lee

(57) ABSTRACT

An improved spring loaded and latchable stake pocket tie down apparatus for rope and the like, made of a main housing, a spline, a push spring, a carriage, a self locking damp, a return spring and a pivot pin whereby a load or the like, will be significantly more secure than the manual knot-tying.

10 Claims, 4 Drawing Sheets

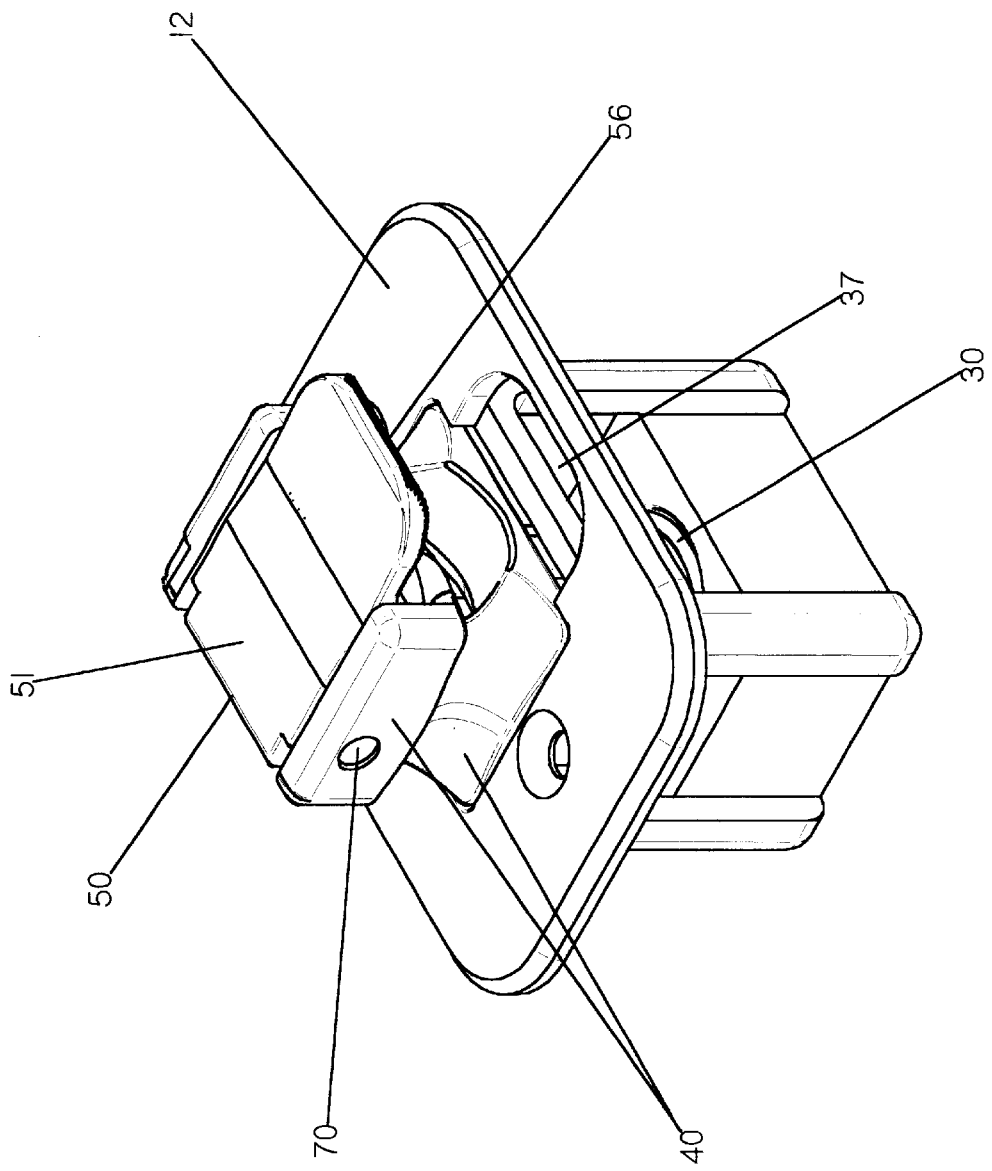
FIG 1.1

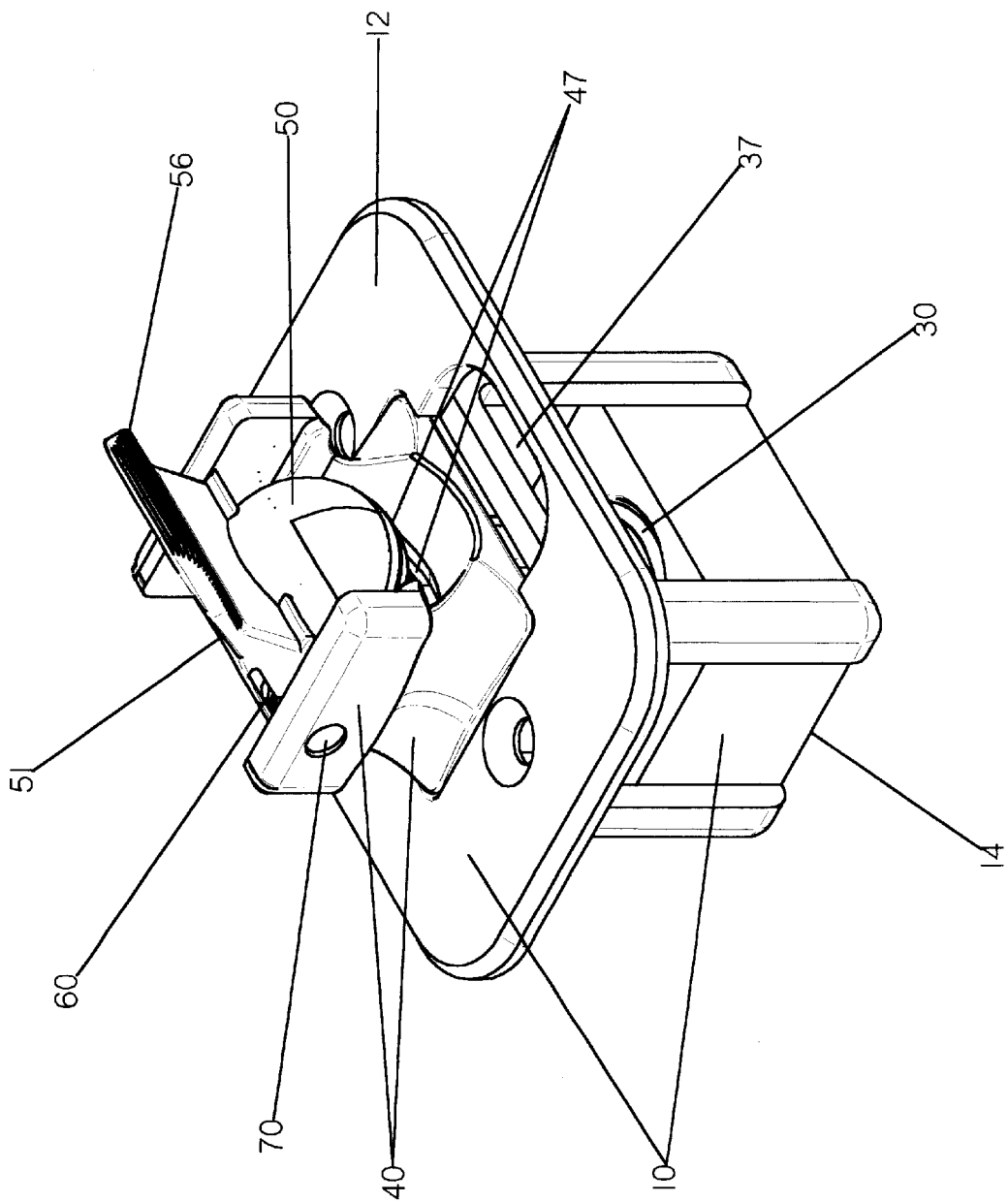
FIG 1.2

SPRING LOADED AND LATCHABLE STAKE POCKET TIE DOWN APPARATUS

REFERENCE TO PRIOR APPLICATION

This application claims the benefit of U.S. Provisional Application No. 60/161,698, filed Oct. 26, 1999, and entitled "Spring Loaded And Latchable Stake Pocket Tie Down Apparatus." The applicant also filed the U.S. application Ser. No. 09/513,728, filed on Feb. 24, 2000, entitled "Self Locking Device."

BACKGROUND OF THE INVENTION

1. Field of the Invention

The present invention relates, in general, to an improved spring loaded and latchable stake pocket tie down apparatus for securing various materials and, more particularly, spring loaded and latchable stake pocket tie down apparatus including a base portion with a cavity space and a self locking damp portion that pivots within the cavity in which ropes, flat webbing, or the like, can be secured.

2. Description of the Prior Art

A variety of devices exist for securing ropes, cables, and the like. These devices are restricted to either rope or flat webbing, such as straps. For example, U.S. Pat. No. 5,548,873 (issued to Madias, I.) discloses a self-locking cleat for rope, in which a rotatable spherically shaped member secures a rope in a spacing of a base member. The spherically shaped member rotates in the base member to create the spacing for the rope. An extended arm attached to the shaped member allows it to pivot.

Because the device is normally used for heavy duty towing, such as being used on a truck, the rope is dragged by a strong force. Any edges on the device that are in contact with the rope can potentially damage the rope. Prior designs of the device have edges on the spherical member that cuts ropes during the pulling. Because of the sharp edge of the spherically shaped member, this device often damages the rope preventing the rope from being reused.

After the spherically shaped member engages the rope for a heavy drag, the rope is stuck in the spacing, and is difficult to release. Because the arm is a thin rod, a person may not be able to release the locking with bare hand, working against such a thin rod. If a tool such as a hammer is used to release the locking, the thin rod protruding from the base may be broken when strong force is applied. The current available device does not allow easy release from the locking.

Also, these previous designs are limited to the securing of rope only and does not work well with straps. In addition, some of the designs have the arm protruding out from the side of the base. A rope that is tied to the base may accidentally move the arm and cause the rope to release.

Furthermore, because the rope is inserted into a passageway, the pulling is normally limited to a direction of the passageway. The rope does not adjust naturally when an object is towed from a different angle.

Still furthermore, the existing devices are attached to their respective attachment surfaces in a stationary manner such that these devices permanently protrude outward from the surfaces and potentially cause objects to get entangled with the devices and otherwise interfere with the overall aesthetics of the objects to which the devices are attached.

Therefore, it is desirable to make an improved spring loaded and latchable stake pocket tie down apparatus that does not cut ropes during the pulling, prevents accidental release, adjusts well from different pulling angles, is easy to be released after pulling, and is capable of being hidden below attachment surfaces while not in use and easily extends out when ready for use.

SUMMARY OF THE INVENTION

It is the objective of the present invention to provide a spring loaded and latchable stake pocket tie down apparatus that: (1) is capable of securing a variety of tying materials; (2) is simple to use; (3) makes tying loads, or the like, safer for transportation on the roads as well as minimizing litter; (4) is capable of being hidden below its attachment surface while not in use and easily extends out when ready for use; and (5) possesses sufficient strength thanks to the materials that make up the apparatus parts.

In the present invention, the apparatus comprises a main housing that has a top housing surface and a bottom housing surface. A spline is securely connected within the housing on the bottom housing surface by a stopper, and a push spring encases the spline.

The apparatus also has a carriage that has a substantially semi-round, cylindrically shaped cavity with grooves formed therein. This carriage is attached to the spline. A carriage lock is located on the housing which allows the carriage to automatically spring up upon being unlocked, and which allows the carriage to remain within the housing when being locked.

The apparatus also has a damp which rotates around a pivot pin connecting the damp embedded within a cavity of a carriage. One pivot position of the damp creates an opening between the clamp and carriage. A rope, strap, or the like can be inserted in the opening created by the pivot position. A return spring connecting the damp and carriage causes the clamp to engage the rope material securing the rope within the opening of the carriage.

A BRIEF DESCRIPTION OF THE DRAWINGS

These and other features, aspects, and advantages of the present invention will become better understood with regard to the following description, appended claims, and accompanying drawings where:

FIG. 1 is perspective view of a preferred embodiment of a spring loaded and latchable stake pocket tie down apparatus in accordance with the present invention, having the clamp in the open position and resting in a vertically extended position, allowing the unit to be in the operating position and ready for use.

FIGS. 1.1 and 1.2 are perspective views of one embodiment of the invention in its popped upstate.

DETAILED DESCRIPTION OF THE PREFERRED EMBODIMENTS

The following discussion describes in detail one embodiment of the invention and several variations of that embodiment This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
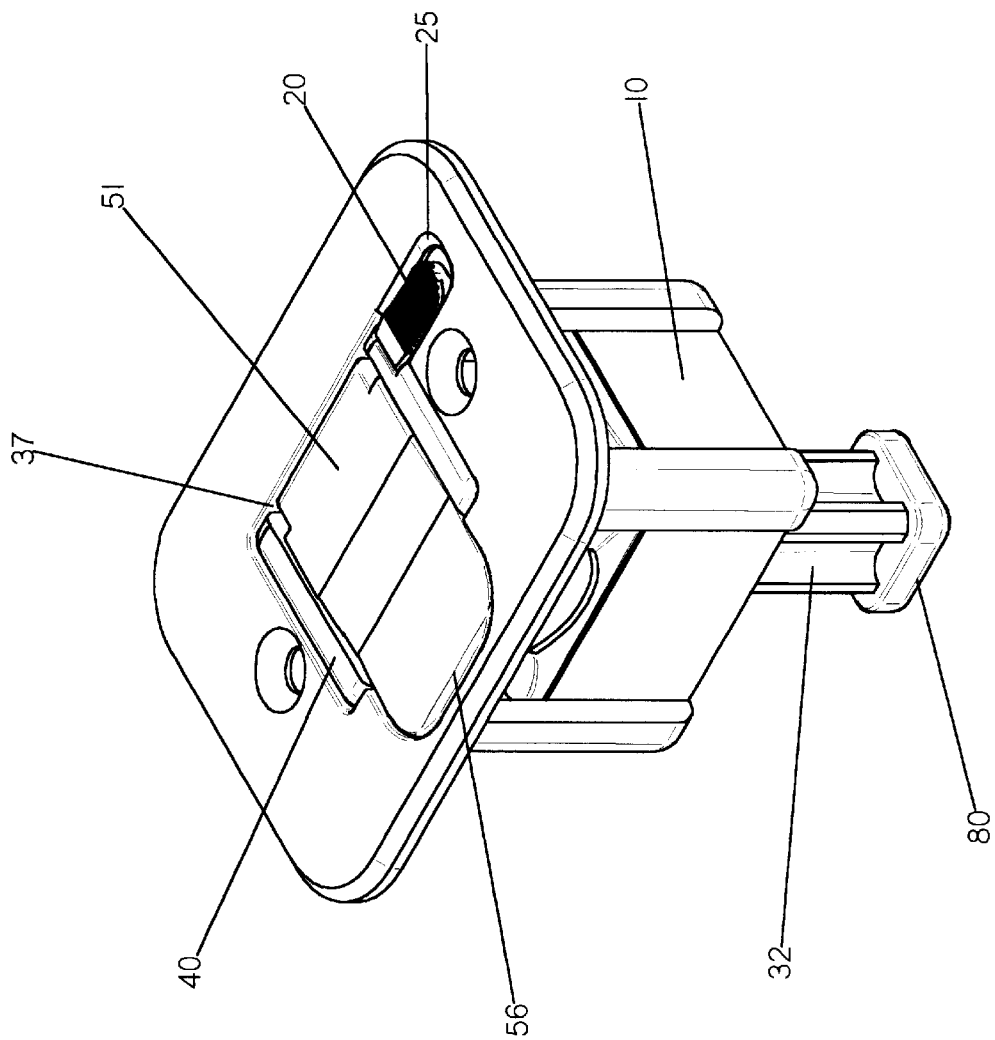

FIG. 1 is the perspective view of one embodiment of the spring loaded and latchable stake pocket tie down apparatus according to the present invention that is adapted to be attached to surfaces such as railings, luggage racks, and truck beds, shown in its pushed down state. As depicted in the perspective view, the present apparatus includes a main housing 10 with a rectangular shape that conceals the apparatus when not in use. A carriage lock 20 is shown locking a carriage 40 containing a damp 50, and the carriage 40 is hidden within a carriage opening 37 and below a top housing surface 12.

FIG. 1.1 is the perspective view of one embodiment of the spring loaded and latchable stake pocket tie down apparatus according to the present invention, shown in its popped up state. A carriage lock 20, when shifted to the open position, releases a push spring 30, laterally moving a carriage 40 to above the main housing 10. This vertical position exposes the carriage 40 and a clamp 50 above the top housing surface 12, while the carriage 40 is secured snugly within the carriage opening 37. Clamp 50 is pivotally attached to carriage 40 by a pivot pin 70. Here, a top surface 51 of clamp 50 is shown in its down state, such that the clamp 50 is closed with respect to the carriage 40.

FIG. 1.2 is the perspective view of one embodiment of the spring loaded and latchable stake pocket tie down apparatus according to the present invention, shown in its popped up state. A carriage lock 20, when shifted to the open position, releases a push spring 30, laterally moving a carriage 40 to above the main housing 10. This vertical position exposes the carriage 40 and a damp 50 above the top housing surface 12, while the carriage 40 is secured snugly within the carriage opening 37. Clamp 50 is pivotally attached to carriage 40 by a pivot pin 70. Here, a top surface 51 of clamp 50 is shown in its up state, such that the clamp 50 is open with respect to the carriage 40, and serrations 47 can be seen.

Figure 2:
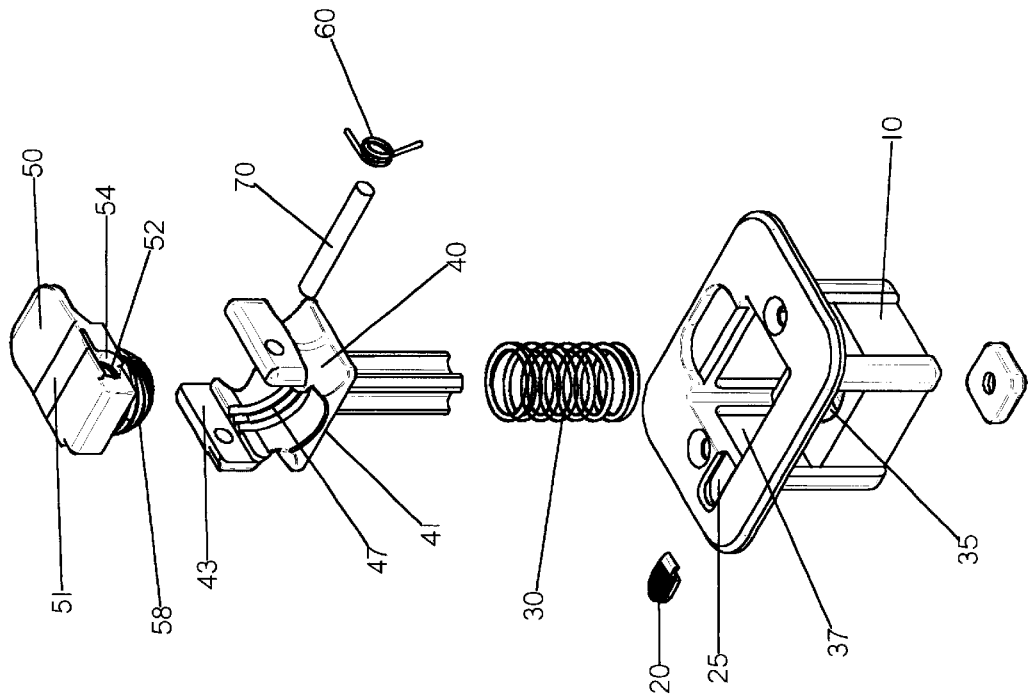
FIG. 2 is an exploded view of the spring loaded and latchable stake pocket tie down apparatus illustrated in FIG. 1.

In FIG. 2, an exploded view showing the various components of this preferred embodiment is provided. As previously shown, the device includes the generally rectangular shaped main housing 10 that may be secured to surfaces such as truck beds. On a top housing surface 12 of the main housing 10 is located the carriage lock 20 for locking and concealing the carriage 40 below the top housing surface 12 when the apparatus is not in use. The carriage 40 is supported by a spline 32 that is encased by the push spring 30 and inserted into a push spring housing 35, such that the spline 32 is securely connected to the main housing 10. A rectangular shaped stopper 80 is mounted onto a bottom surface 14 of the main housing 10 to prevent the push spring 30 from extending past the bottom housing surface 14 of the housing 10. The carriage 40 generally has a bottom surface 41 that is flat with two sides 43, 44 (shown in FIG. 3) that extend upwards from the bottom surface 41, forming a cavity for the clamp 50. The bottom surface of the cavity is characterized by serrations 47. Also, holes 45, 46 on the sides 44, 43, respectively, allow a pivot pin 70 to be inserted across both sides. The clamp 50 generally has a top surface 51 with an extended tab 56 to rotate the clamp around the pivot pin 70. Holes 52 and 54 on each side of the clamp 50 allow for the insertion of the pivot pin 70. The bottom surface 58 of the clamp is semi-spherically shaped with the surface having serrations, like the bottom surface of the cavity of the carriage 47. A return spring 60, which connects the clamp 50 and carriage 40 allows the clamp 50 to shift between an open and dosed position.

Figure 3:
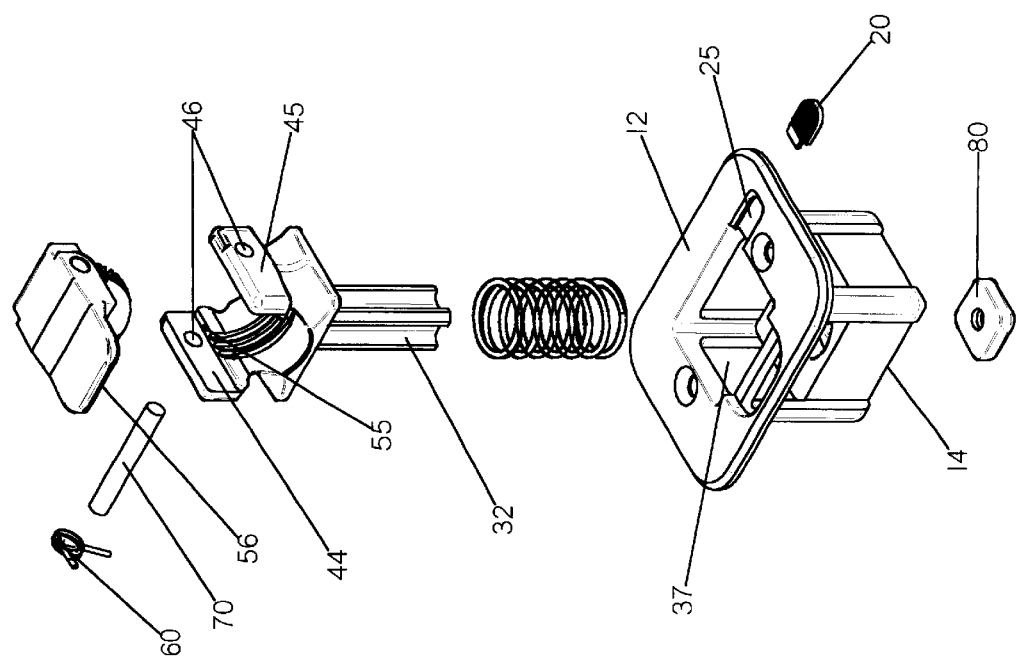
FIG. 3 is an exploded showing the components of a preferred embodiment of the invention.

In FIG. 3, another exploded view showing the various components of this preferred embodiment is provided. As previously shown, the device includes the generally rectangular shaped main housing 10 that may be secured to surfaces such as truck beds. Within a carriage lock track 25 contained in a top housing surface 12 of the main housing 10 is located the carriage lock 20 for locking and concealing the carriage 40 below the top housing surface 12 when the apparatus is not in use. The carriage 40 is supported by a spline 32 that is encased by the push spring 30. A rectangular shaped stopper 80 is mounted onto a bottom surface 14 of the main housing 10 to prevent the push spring 30 from extending past the bottom housing surface 14 of the housing 10. The carriage 40 generally has a bottom surface 41 that is flat with two sides 43 (shown in FIG. 2), 44 that extend upwards from the bottom surface 41, forming a cavity for the clamp 50. The bottom surface of the cavity is characterized by serrations 47. Also, to holes 45, 46 on the sides 44, 43, respectively, allow a pivot pin 70 to be inserted across both sides, The damp 50 generally has a top surface 51 with an extended tab 56 to rotate the clamp around the pivot pin 70. Holes 52 and 54 on each side of the clamp 50 allow for the insertion of the pivot pin 70. The bottom surface 58 of the damp is semi-spherically shaped with the surface having serrations, like the bottom surface of the cavity of the carriage 47. A return spring 60, with its one end fitting into a return spring retainer hole 55, connects the clamp 50 and carriage 40 and allows the clamp 50 to shift between an open and closed position.

The spring loaded and latchable stake pocket tie down apparatus of the present invention is extremely strong in its tensile strength thanks to the type of materials that make up the parts. In a preferred embodiment, the parts of the apparatus, including but not limited to the spline, the main housing, the clamp, and the carriage, can be made of an aluminum, thus providing a tensile strength of about 20,000 psi for the entire apparatus. In another embodiment, the parts can be made of stainless steel, in which case the tensile strength is roughly 40–45,000 psi. In yet another embodiment if the parts of the apparatus are made of titanium, the tensile is over 60,000 psi.

What is claimed is:

1. A spring loaded and latchable stake pocket tie down apparatus comprising:
    a) a main housing having a push pin housing;
    b) a spline inserted through the push pin housing;
    c) a push spring encasing the spline;
    d) a carriage being attached to the spline comprising:
        i) a base having a cavity therein;
    e) a damp comprising:
        i) a lever; and
        ii) a locking portion that rests in the cavity of the base;
    f) a return spring connected to the clamp and the carriage;
    g) a pivot pin connected to the base, the clamp, and the return spring, such that the clamp pivots in the cavity of the carriage;
    h) wherein the locking portion rests inside the cavity of the carriage such that a cable may be secured between the clamp and the cavity; and
    i) wherein the carriage is capable of a vertical springing motion, such that the carriage remains substantially within the apparatus when the apparatus is not in use, and a carriage protrudes outward above the top surface of the main housing when the apparatus is in use.

2. A spring loaded and latchable stake pocket tie down apparatus in claim 1 wherein the cavity of the carriage has a plurality of grooves formed therein.

3. A spring loaded and latchable stake pocket tie down apparatus in claim 1 wherein the locking portion has a substantially semispherically shaped bottom having a plurality of grooves formed thereon.

4. A spring loaded and latchable stake pocket tie down apparatus in claim 3 wherein the locking portion has a plurality of grooves formed on about half of the substantially semi-spherically shaped bottom, with another half of the substantially semi-spherically shaped bottom being a smooth surface.

5. A spring loaded and latchable stake pocket tie down apparatus in claim 1 wherein the lever has a bottom side having a plurality of grooves.

6. A spring loaded and latchable stake pocket tie down apparatus in claim 1 wherein the lever further comprises a bottom side, said lever being capable of protruding outward from the carriage such that a user may release the cable from the clamp by lifting the bottom side of the lever.

7. A spring loaded and latchable stake pocket tie down apparatus in claim 1 wherein the locking portion has a bore such that the pivot pin is fitted inside the bore.

8. A spring loaded and latchable stake pocket tie down apparatus in claim 1 wherein the cavity of the carriage has a plurality of grooves formed therein, and wherein the locking portion has a plurality of grooves formed on a substantially semi-spherically shaped bottom thereof.

9. A spring loaded and latchable stake pocket tie down apparatus in claim 1 wherein the cavity of the carriage is semispherical in shape.

10. A spring loaded and latchable stake pocket tie down apparatus comprising:

a) a main housing having a top housing surface and a bottom housing surface;

b) a spline having a top end and a bottom end, said spline being secured to said bottom housing surface by a stopper;

c) a push spring encasing said spline;

d) a carriage having a substantially semi-round cylindrically-shaped cavity, said carriage being attached to the top end of the spline, and said cavity having a plurality of grooves formed therein;

e) a carriage lock being attached to the top housing surface, wherein said carriage lock, upon being unlocked, is capable of allowing the carriage to move up and protrude vertically upward from the main housing, and wherein said carriage, upon being locked, is capable of allowing the carriage to remain substantially or entirely below the top housing surface;

f) a damp being pivotally connected to the carriage and having a first and second ends, comprising:

i) a lever portion with a substantially flat surface on the first end on a top side and a bottom side, wherein the lever portion has a plurality of grooves on the bottom side;

ii) a locking portion on the second end having a substantially semi-spherically shaped bottom and a substantially flat surface on top, wherein the locking portion has a plurality of grooves formed on the substantially semi-spherically shaped bottom;

g) a return spring connected to the clamp and the housing;

h) a pivot pin connected to the cavity, the clamp, the return spring, so that the clamp pivots substantially in the cavity of the housing;

wherein the locking portion rests inside the cavity of the housing such that a cable may be secured between the clamp and the cavity of the housing, wherein the lever portion protrudes from the housing such that a user may release the cable from the clamp by pushing on the bottom side of the lever portion.

* * * * *